US009658884B2

(12) United States Patent
Xu et al.

(10) Patent No.: US 9,658,884 B2
(45) Date of Patent: *May 23, 2017

(54) SMART DATA STAGING BASED ON SCHEDULING POLICY

(71) Applicant: Microsoft Technology Licensing, LLC, Redmond, WA (US)

(72) Inventors: MingQiang Xu, Shanghai (CN); Colin Watson, Kirkland, WA (US); Jun Su, Shanghai (CN); Yiding Zhou, Shanghai (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 185 days.

This patent is subject to a terminal disclaimer.

(21) Appl. No.: 14/613,614

(22) Filed: Feb. 4, 2015

(65) Prior Publication Data
US 2015/0154049 A1    Jun. 4, 2015

Related U.S. Application Data

(63) Continuation of application No. 13/606,268, filed on Sep. 7, 2012, now Pat. No. 8,954,529.

(51) Int. Cl.
    *G06F 15/16*    (2006.01)
    *G06F 9/48*    (2006.01)

(52) U.S. Cl.
    CPC .......... *G06F 9/4881* (2013.01); *G06F 9/4818* (2013.01); *G06F 9/4856* (2013.01)

(58) Field of Classification Search
    USPC ....................................................... 709/217
    See application file for complete search history.

(56) References Cited

U.S. PATENT DOCUMENTS

| | | |
|---|---|---|
| 5,038,348 A | 8/1991 | Yoda et al. |
| 5,602,754 A | 2/1997 | Beatty et al. |
| 5,966,072 A | 10/1999 | Stanfill et al. |
| 7,174,536 B1 | 2/2007 | Kothari et al. |
| 7,734,775 B2 | 6/2010 | Barnett et al. |
| 2002/0143973 A1 | 10/2002 | Price |

(Continued)

OTHER PUBLICATIONS

Singh, et al., "Optimizaing Workflow Data Footprint", In Proceedings of Scientific Programming—Dynamic Computational Workflows: Discovery, Optimization and Scheduling Table of Contents Archive, vol. 15, Issue 4, Dec. 2007, 20 pages.

(Continued)

*Primary Examiner* — Hee Soo Kim
(74) *Attorney, Agent, or Firm* — Workman Nydegger

(57) ABSTRACT

An embodiment includes selecting a job to upload to a remote system, uploading a portion of data for the job to the remote system, and receiving notice that the portion of data for the job has been staged at the remote system. The embodiment also includes, based on the portion of data being staged, instructing the remote system to begin performing operations for the job on the portion of the data, where after the remote system begins to perform the operations for the job on the portion of data prior to all data for the job being uploaded. From an alternate perspective an embodiment includes receiving a description of a job to be performed on data, receiving a portion of the data, receiving an instruction to begin performing computations on the portion of data, and beginning to perform identified computations on the portion of data before receiving all the data.

20 Claims, 3 Drawing Sheets

(56) References Cited

U.S. PATENT DOCUMENTS

| | | |
|---|---|---|
| 2003/0135621 A1 | 7/2003 | Romangnoli |
| 2004/0133876 A1 | 7/2004 | Sproule |
| 2005/0165631 A1 | 7/2005 | Horvitz |
| 2006/0111888 A1 | 5/2006 | Hiew et al. |
| 2007/0169049 A1 | 7/2007 | Gingell et al. |
| 2008/0079724 A1 | 4/2008 | Isard |
| 2010/0042720 A1 | 2/2010 | Stienhans |
| 2011/0016214 A1 | 1/2011 | Jackson |
| 2011/0069935 A1 | 3/2011 | Baek |
| 2011/0138391 A1 | 6/2011 | Cho et al. |
| 2011/0161391 A1 | 6/2011 | Araujo |
| 2011/0179162 A1 | 7/2011 | Mayo |
| 2012/0060165 A1 | 3/2012 | Clarke |
| 2012/0066667 A1 | 3/2012 | Mascaro |
| 2013/0117752 A1 | 5/2013 | Li |

OTHER PUBLICATIONS

Monti, et al., "CATCH: A Cloud-based Adaptive Data Transfer Service for HPC", In Proceeding of IEEE International Parallel & Distributed Processing Symposium, May 16, 2011, 12 pages.

"International Search Report & Written Opinion for PCT Patent Application No. PCT/US2013/058356", Mailed Date: Dec. 5, 2013, Filed Date: Sep. 6, 2013, 9 pages.

Monti, et al., "Just-In-Time Staging of Large Input Data for Supercomputing Jobs", In Proceedings of Petascale Data Storage Workshop, Nov. 17, 2008, 5 pages.

Monti, et al., "Reconciling Scratch Space Consumption, Exposure, and Volatility to Achieve Timely Staging of Job Input Data", In IEEE International Parallel & Distributed Processing Symposium (IPDPS) Apr. 19, 2010, 12 pages.

Office Action cited in U.S. Appl. No. 13/606,268, mailed Apr. 16, 2014.

Notice of Allowance cited in U.S. Appl. No. 13/606,268, mailed Sep. 25, 2014.

Shizuki et al. "Static Visualization of Dynamic Data Flow Visual Program Execution" 2002, IEEE, Computer Society, 6 pages.

Francik "Specifying Algorithm Visualizations in Terms of Data Flow" 2002, IEEE, Computer Society, 8 pages.

"Tool: Visual Modeling Framework for Distributed Multiscale, Multiparadigm Simulations" Accessed as early as Jul. 16, 2010.

Liu "A Distributed Data Flow Model for Composing Software Services" Jun. 2003, 192 pages.

Olsson et al. "A Dataflow Approach to Event-Based Debugging" Software—Practice and Experience, vol. 21(2), pp. 209-229, Feb. 1991.

SMART DATA STAGING BASED ON SCHEDULING POLICY

CROSS REFERENCE TO RELATED APPLICATIONS

This application is a continuation of U.S. patent application Ser. No. 13/606,268, filed Sep. 7, 2012, and entitled "SMART DATA STAGING BASED ON SCHEDULING POLICY," and which issued as U.S. Pat. No. 8,954,529 on Feb. 10, 2015. The entire content of the foregoing application is incorporated by reference herein in its entirety.

BACKGROUND

Background and Relevant Art

Computers and computing systems have affected nearly every aspect of modern living. Computers are generally involved in work, recreation, healthcare, transportation, entertainment, household management, etc.

Further, computing system functionality can be enhanced by a computing systems ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently receive application data from other computing system. These connections have allowed for the proliferation of cloud computing.

Moving from localized computing to cloud computing has posed several challenges to end users, including how, where and when to stage data into and out of the cloud as part of workflows performing operations on the data. For example, it can be difficult to determine when and how to move data from a local storage to the cloud, when to operate on the data at the cloud, and when to move the data back from the cloud to the local storage.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Embodiments herein are directed to staging data from a first system to a second system, and beginning computations on the data. From a perspective of the first system, an embodiment includes receiving a plurality jobs, each of the plurality of jobs specifying one or more operations to be performed on data to be sent to the remote system. A particular job of the plurality of jobs is selected for uploading to the remote system. A portion of data related to the particular job is uploaded to the remote system for staging at the remote system, the portion of data to be operated on at the remote system by the one or more operations of the particular job. Notice that the portion of data related to the particular job has been staged at the remote system is received. Based on the portion of data being staged at the remote system, the remote system is instructed to begin performing the one or more operations for the particular job on the portion of the data related to the particular job, where after the remote system begins to perform the one or more operations for the particular job on the portion of data related to the particular job prior to all data related to the particular job being uploaded to the remote system.

From a perspective of the second system, and embodiment includes receiving, from a remote system, a description of a job to be performed on a set of data stored at the remote system, the description of the job identifying computations to be performed on the set of data. A portion of the set of data and an instruction to begin performing the identified computations on the portion of the set of data are received from the remote system. The identified computations on the portion of the set of data are begun to be performed before receiving the entire set of data, and the identified computations are continued to be performed on additional portions of the set of data after they are received from the remote system.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
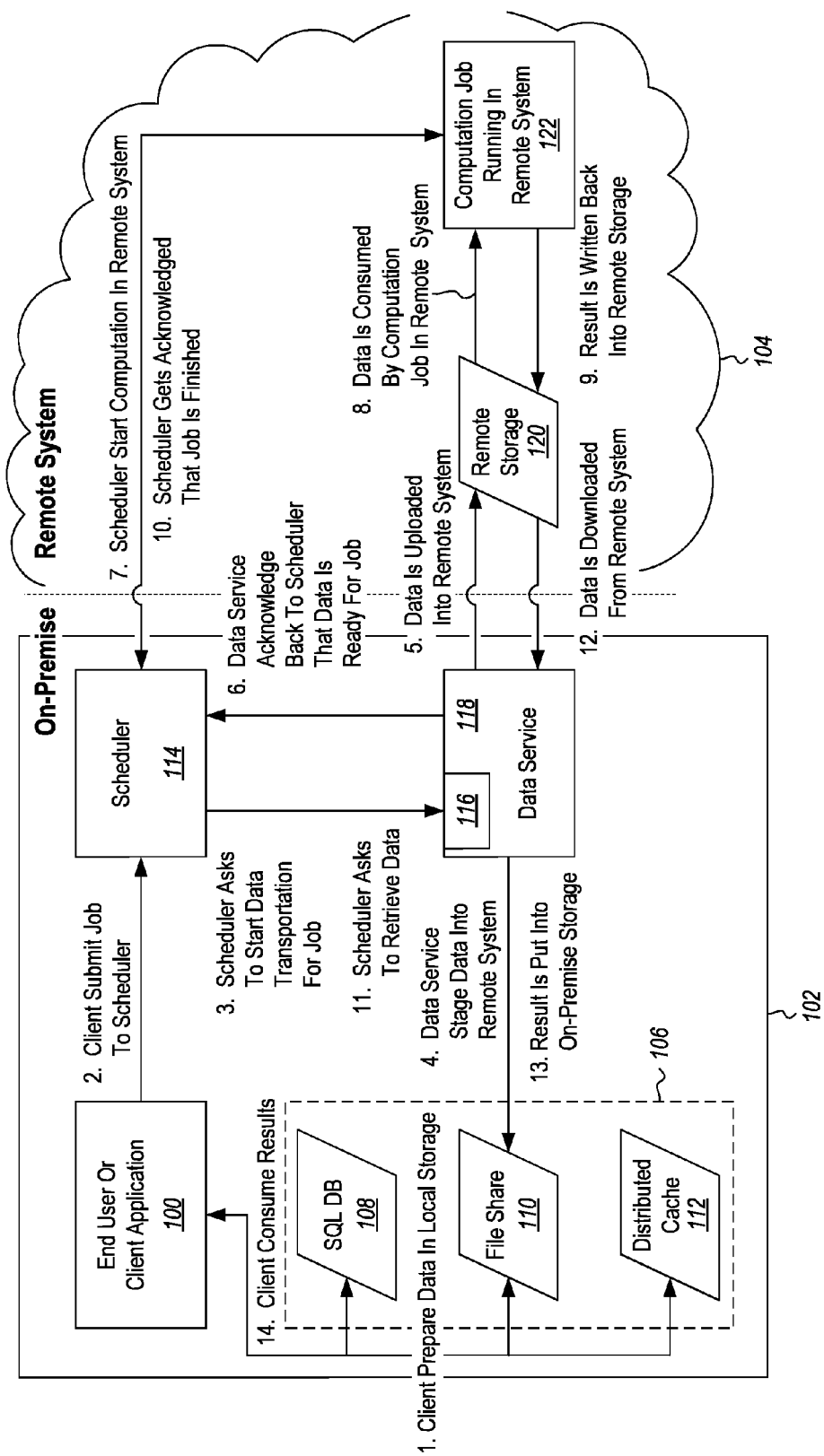
FIG. 1 illustrates first and second systems that in this example include a local system and a "cloud" system remote from the local system, and systems for sending jobs from the on-premises system to the cloud system.

Previously, systems have been configured to treat data staging, whereby data is moved from a first system to a second system (such as data center systems), and computation inside the second system (whereby operations are performed on data) as two separate activities and to manage them accordingly. For example, data may be moved from a local system to a remote system (such as a so-called "cloud" based system) where computations will be performed on the data at the remote system. As used herein, local and remote are used to distinguish the two systems and to indicate some distance in either logical or physical proximity to each other. In some examples, the local system may be local to end users, however this is not absolutely required. For example, local may simply refer to the fact that the system is local to, and owned by an enterprise whereas the remote system may be a system only shared by the enterprise with other enterprises.

Ignoring the fact that computations on data correlate with data input and output introduces inefficiencies on remote system resources. Some embodiments described herein address these inefficiencies by combining computation at remote systems with data staging from a local system to the remote system, the remote system being remote from the local system. For example, once data from a local storage has started to be staged to a remote system, computations can be begun on the data. In particular, once a partial portion of data has been moved to the remote system, computation workflows can be started even though an entire dataset has not been staged to the remote system. Further, embodiments may be configured such that if there are multiple computations placed by a user into a queue of jobs, a data service can choose the priority in which jobs are moved into the remote system so as to efficiently use various resources, including local system resources, remote system resources, network bandwidth resource, etc. while still ensuring that jobs are performed to meet priority constraints, time constraints, usage limits, etc. Further, within a given job computations are performed on a given data set. Different portions of the data set may be prioritized for staging over other portions of the data set so as to efficiently perform the operations at the remote system.

As each computation iteration only requires its portion of input data to start, and its output does not depend on the other iterations to complete, it is possible to start iterations while input data to other iterations is being transferred. Also, output data can be transferred back to the local system while other iterations are still in process.

As noted, some embodiments described herein implement activities of staging data into a remote system as part of a cluster burst to remote system workflow. By making data as a first class citizen, the cluster will take data as a job resource when implementing a scheduling algorithm. This is beneficial in that the scheduler is aware of the data dependencies of a job and can orchestrate data staging in conjunction with running the job. Thus, a portion of data can be staged to the remote system. Operations can be begun on the data while other portions of the data for the job remain at the local system. Remaining portions of the data can be staged to the remote system as needed given that the scheduler is aware of the data dependencies and can stage the data to the remote system as needed at the appropriate times. Further, jobs and data can be staged to the remote system based on job run time, priority, position in the queue and data size. This can produce much more efficient usage of remote system and network resources and reduce job turn-around time. Further, this may be beneficial in that the data service in a scheduler can handle data movement for a user, make sure data is in the right place before and after job execution, and clean up unused remote system storage. This can free the user from many of the tasks for managing a data lifecycle explicitly.

Illustrating now additional details, and with reference to FIG. 1, an example is illustrated. FIG. 1 illustrates a local system 102 and a remote system 104, which in some embodiments may be a so called "cloud computing" based system. In this description, "cloud computing" may be systems or resources for enabling ubiquitous, convenient, on-demand network access to a shared pool of configurable computing resources (e.g., networks, servers, storage, applications, and services) that can be provisioned and released with reduced management effort or service provider interaction. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

As illustrated at step 1, a client 100 prepares data in a local storage 106 at the local system 102. In the example illustrated, local storage may include, for example, a database 108, a file share 110, a distributed cache 112, etc. Preparing data in a local storage 106 at the local system 102 may include for example generating and storing data, or otherwise creating data for storage in a storage system.

As illustrated at step 2, the client 100 submits a job to a scheduler 114. While in the example illustrated, the scheduler 114 is illustrated as being implemented in the local system 102, it should be appreciated that in other embodiments, the scheduler 114 may be implemented partially or wholly in the remote system 104. The user may be able to specify job input and job operations or computations as job metadata as part of the job submission to the scheduler 114. The scheduler 114 will treat those job input data as a resource. Treating the input data as a job resource means treating the input data as a resource that the job requires. For example, just as computer hardware might be treated as a job resource needed to perform a job, as the job needs computation resources on which to run the job, input data could be treated as a needed resource for the job.

When the scheduler 114 determines that the job will (or may) run in the remote system 104, the scheduler 114 will ask to start data transportation for the job as illustrated at step 3 by putting the data in a remote system staging queue 116, at a cluster data service 118, for transport. Notably, while the cluster data service 118 is illustrated in the local system 102, it should be appreciated that in other embodiments, the cluster data service 118 may be implemented partially or wholly in the remote system 104.

Jobs can be prioritized in the queue 116. That is, jobs are not necessarily performed in the order that they are placed into the queue. The data service can choose the priority in which jobs are moved into the remote system 104 so as to efficiently use various resources, including remote system resources, network bandwidth resource, etc. while still ensuring that jobs are performed to meet priority constraints, time constraints, usage limits, etc. For example, in some embodiments, the priority of the job in the queue 116 may be decided by one or more of: the order the job was placed in the queue, the time to perform a job, data transportation time, job priority, remote system resource availability, network resource availability, super user specification of job priority, etc. For example, a job may be given priority over other jobs simply based on the amount of time the job has been in the queue 116 as compared to other jobs. Jobs that take a long time to run may have higher priority when remote system resources are being less utilized and lower priority when remote system resources are being more utilized. Jobs that consume large amounts of network resources to be staged to the remote system 104 may have lower priority when network usage is already high and higher priority when network usage is lower. Jobs may be manually or automatically assigned a higher priority than other jobs based on the importance of the jobs or time critical nature of the jobs. Etc. The various factors could be weighted and used in combination such that several factors could be used to determine a job's overall priority as compared to other jobs in the queue 116.

The cluster data service 118 is in charge of transporting all data in the queue 116 into remote system storage 120. Steps 4 and 5 illustrate the data service 118 staging data into the remote system 104 and uploading data into the remote system 104 respectively. The cluster data service 118 can handle various different kinds of data and files. For example, FIG. 1 illustrates that data may be database data in a database 108, flat file data in a file share 110, binary data in distributed cache 112, etc. The data staging progress is reported back to scheduler as illustrated at act 6 so that scheduler 114 can decide to start running the job in the remote system 104 as illustrated at act 7 of FIG. 1. The job is performed in the remote system 104 as illustrated at 8 and 9 by data stored in the remote system storage 120 being consumed by a computation job 122 running in the remote system 104 and results of the computation being sent back to the remote system storage 120.

When the job is done, the scheduler 114 will receive an acknowledgment from the computation job 122 (as illustrated at step 10) and the scheduler 114 will inform the data service 118 to collect all job results as illustrated at step 11. The data service 118 downloads the results from the remote system storage 120 as illustrated at step 12 and then sends the results to the on-premises storage 106 as illustrated at step 13. Remote system resources can then be de-provisioned or wiped by future jobs. As noted, data staging activities to stage data from the on-premises storage 106 to the remote system storage 120 are done in parallel with cluster computation jobs performed at the remote system 104. However, embodiments may be implemented where a job will not start running until the scheduler 114 is sure that all necessary data is prepared for staging to the remote system 104 for the job so there are no running jobs sitting idly and waiting for data.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 2:
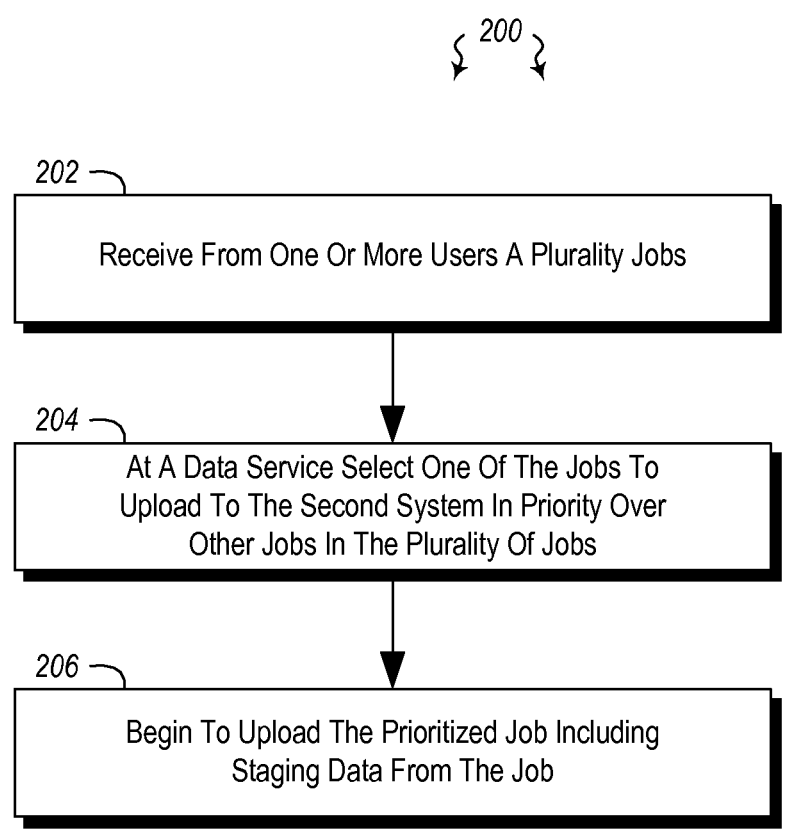
FIG. 2 illustrates a method of moving data from a first system to a second system from the perspective of the first system.

Referring now to FIG. 2, a method 200 is illustrated. The method 200 may be practiced in a networked computing environment. The method 200 includes acts for moving data from a first system to s a second system remote from the first system and performing computations on the data. The method 200 includes receiving from one or more users a plurality jobs (act 202). The one or more jobs specify both data to be operated on and the operations to be performed on the data at the second system.

The method 200 further includes, at a data service selecting one of the jobs to upload to the second system in priority over other jobs in the plurality of jobs (act 204). For example, the method 200 may be practiced where selecting one of the jobs to upload to the second system in priority over other jobs in the plurality of jobs comprises selecting a job based on job runtimes. For example, if it is known that a job will take comparatively longer than an average time to run, the job may be prioritized for upload when the second system has more available resources. Alternatively or additionally, the method 200 may be practiced where selecting one of the jobs to upload to the second system in priority over other jobs in the plurality of jobs comprises selecting a job based on order that jobs were placed in a queue. For example, jobs that have been in the queue longer than other jobs may be prioritized for upload over other jobs. The method 200 may be practiced where selecting one of the jobs to upload to the second system in priority over other jobs in the plurality of jobs comprises selecting a job based on time to transport data from jobs. The method 200 may be practiced where selecting one of the jobs to upload to the second system in priority over other jobs in the plurality of jobs includes selecting a job based on resource availability in the second system. The method 200 may be practiced where selecting one of the jobs to upload to the second system in priority over other jobs in the plurality of jobs comprises selecting a job based on network availability.

The method 200 further includes beginning to upload the prioritized job including staging data from the job (act 206).

At the second system, once a portion of the data has been received, a service in the second system begins to perform the specified operation on the data for the prioritized job. Beginning to perform the specified operation is performed prior to all of the data from the prioritized job being uploaded to the second system. Rather, the operations can be begun before all data has arrived and can be continued as data continues to arrive.

The method 200 may further include staging additional portions of the data from the job to the second system based on an order that data will be operated on by the job.

Figure 3:
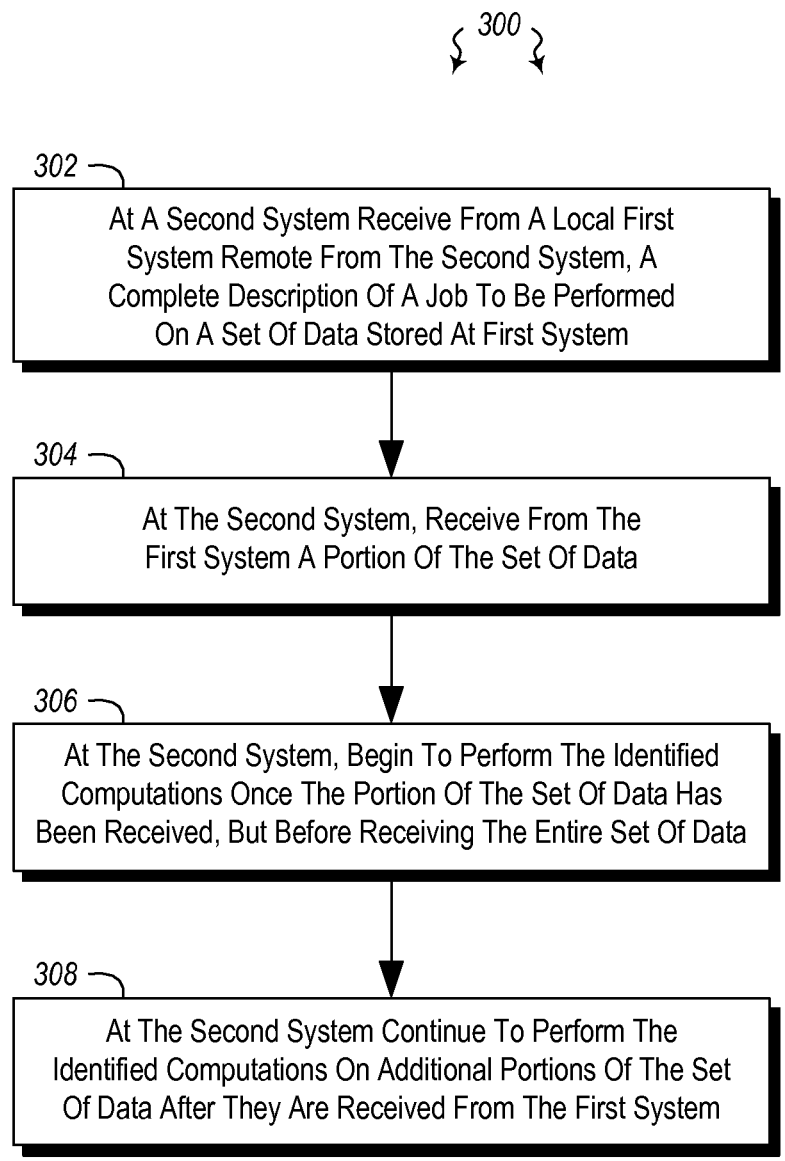
FIG. 3 illustrates a method of moving data from a first system to a second system from the perspective of the second system.

Referring now to FIG. 3, a method 300 is illustrated. The method 300 may be practiced in a second system computing environment. The method 300 includes acts for moving data from a first system to a second system remote from the first system and performing computations on the data. The method 300 includes, at a second system receiving from a first system remote from the second system, a complete description of a job to be performed on a set of data stored at the first system (act 302). The description of the job identifies computations to be performed on the set of data. The description of the job is received in priority to other jobs received by the second system from the first system The method 300 further includes, at the second system, receiving from the first system a portion of the set of data (act 304).

The method 300 further includes, at the second system, beginning to perform the identified computations once the portion of the set of data has been received, but before receiving the entire set of data (ac 306).

The method 300 further includes at the second system continuing to perform the identified computations on additional portions of the set of data after they are received from the first system (act 308).

The method 300 may further include sending results of portions of the identified computations to the first system before completing all of the identified computations. For example, if computations on data and results have been generated prior to completing all computations, then those results can be sent back to the local system 102.

The method 300 may further include sending results of portions of the identified computations to the first system before receiving the entire set of data from the first system. For example, some results may be able to be computed by the computation job 122 prior to all data to have computations performed on it being staged to the remote system 104. However, this does not prevent those results from being delivered back to the local system 102. Rather, the results can be delivered when they are ready irrespective of whether or not all computations for the job have been completed or not.

The method 300 may further include continuing to receive additional portions of the set of data from the first system. The additional portions are received in an optimized order based on the identified computations to be performed on the set of data. For example, the scheduler 114 may be aware of what data is needed and the order that the data is to be operated on to complete the job. Thus, the scheduler can stage data to the remote system 104 as needed and in an order based on computations to be performed at the remote system 104.

The method 300 may further include, at the second system service, prior to receiving the complete description of a job to be performed on a set of data stored at the first system, sending to the first system an indication of the amount of resources available at the second system service. In some such embodiments, the priority the job is determined based on the amount of resources available at the second system.

The method 300 may be practiced where the priority of the job is determined based on run times of jobs at the first system.

The method 300 may be practiced where the priority of the job is determined based on time to transport data from jobs at the first system.

Further, the methods may be practiced by a computer system including one or more processors and computer readable media such as computer memory. In particular, the computer memory may store computer executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer readable storage media and transmission computer readable media.

Physical computer readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer readable media to physical computer readable storage media (or vice versa). For example, computer-executable instructions or data structures received over a network or data link can be buffered in RAM within a network interface module (e.g., a "NIC"), and then eventually transferred to computer system RAM and/or to less volatile computer readable physical storage media at a computer system. Thus, computer readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising one or more hardware storage devices having stored thereon computer-executable instructions that, when executed by one or more processors of a computer system, cause the computer system to upload data to a remote system, and cause the remote system to perform computations on the data, including at least the following:
  receive a plurality jobs, each of the plurality of jobs specifying one or more operations to be performed on data to be sent to the remote system;
  select a particular job of the plurality of jobs to upload to the remote system;
  upload a portion of data related to the particular job to the remote system for staging at the remote system, the portion of data to be operated on at the remote system by the one or more operations of the particular job;
  receive notice that the portion of data related to the particular job has been staged at the remote system; and
  based on the portion of data being staged at the remote system, instruct the remote system to begin performing the one or more operations for the particular job on the portion of the data related to the particular job, where after the remote system begins to perform the one or more operations for the particular job on the portion of data related to the particular job prior to all data related to the particular job being uploaded to the remote system.

2. The computer program product of claim 1, wherein selecting the particular job to upload to the remote system comprises selecting the particular job in priority over other jobs in the plurality of jobs.

3. The computer program product of claim 2, wherein selecting the particular job in priority over other jobs in the plurality of jobs comprises selecting the particular job based on an order in which the plurality of jobs were placed in a queue.

4. The computer program product of claim 2, wherein selecting the particular job in priority over other jobs in the plurality of jobs comprises selecting the particular job based on time to transport data from jobs.

5. The computer program product of claim 2, wherein selecting the particular job in priority over other jobs in the plurality of jobs comprises selecting the particular job based on resource availability at the remote system.

6. The computer program product of claim 1, wherein selecting the particular job in priority over other jobs in the plurality of jobs comprises selecting the particular job based on network availability.

7. The computer program product of claim 1, wherein selecting the particular job in priority over other jobs in the plurality of jobs comprises selecting the particular job based on job runtimes.

8. The computer program product of claim 1, further comprising:
  uploading additional portions of the data for the particular job to the remote system for staging based on an order that the data will be operated on by the one or more operations.

9. A computer system, comprising:
  one or more processors; and
  one or more computer readable media having stored thereon computer executable instructions that, when executed by at least one of the one or more processors, the computer system to upload data to a remote system, and cause the remote system to perform computations on the data, including at least the following:
    receive a plurality jobs, each of the plurality of jobs specifying one or more operations to be performed on data to be sent to the remote system;
    select a particular job of the plurality of jobs to upload to the remote system;
    upload a portion of data related to the particular job to the remote system for staging at the remote system, the portion of data to be operated on at the remote system by the one or more operations of the particular job;
    receive notice that the portion of data related to the particular job has been staged at the remote system; and
    based on the portion of data being staged at the remote system, instruct the remote system to begin performing the one or more operations for the particular job on the portion of the data related to the particular job, where after the remote system begins to perform the one or more operations for the particular job on the portion of data related to the particular job prior to all data related to the particular job being uploaded to the remote system.

10. The computer system of claim 9, wherein selecting the particular job to upload to the remote system comprises selecting the particular job in priority over other jobs in the plurality of jobs.

11. The computer system of claim 10, wherein selecting the particular job in priority over other jobs in the plurality of jobs comprises selecting the particular job based on one or more of: (1) an order in which the plurality of jobs were placed in a queue, (2) time to transport data from jobs, (3) resource availability at the remote system, (4) network availability, (5) job runtimes, and (6) a user specification of job priority.

12. The computer system of claim 9, further comprising:
  receiving notice from the remote system that the particular job has completed.

13. The computer system of claim 12, further comprising:
  based on receiving notice from the remote system that the particular job has completed, collecting results of the particular job from the remote system.

14. A computer program product comprising one or more hardware storage devices having stored thereon computer-executable instructions that, when executed by one or more processors of a computer system, cause the computer system to receive data from a remote system, and to perform computations on the data, including at least the following:
  receive, from a remote system, a description of a job to be performed on a set of data stored at the remote system, the description of the job identifying computations to be performed on the set of data;
  receive, from the remote system, a portion of the set of data;
  receive, from the remote system, an instruction to begin performing the identified computations on the portion of the set of data;
  beginning to perform the identified computations on the portion of the set of data before receiving the entire set of data; and
  continuing to perform the identified computations on additional portions of the set of data after they are received from the remote system.

15. The computer program product of claim 14, further comprising:
  sending results of portions of the identified computations to the remote system before completing all of the identified computations.

16. The computer program product of claim 14, further comprising:

sending results of portions of the identified computations to the remote system before receiving the entire set of data from the remote system.

17. The computer program product of claim 14, further comprising:
continuing to receive additional portions of the set of data from the remote system, wherein the additional portions are received in an optimized order based on the identified computations to be performed on the set of data.

18. The computer program product of claim 14, further comprising:
prior to receiving from the remote system the description of the job to be performed on the set of data stored at the remote system, sending to the remote system an indication of an amount of resources available at the computer system, and wherein a priority the job is determined by the remote system based on the amount of resources available at the computer system.

19. The computer program product of claim 14, wherein the description of the job is received in priority to other jobs received from the remote system, and wherein a priority of the job is determined based on run times of jobs at the remote system.

20. The computer program product of claim 14, wherein the description of the job is received in priority to other jobs received from the remote system, wherein the priority of the job is determined based on time to transport data from the remote system.

* * * * *